United States Patent [19]

Mullins

[11] Patent Number: 5,340,481

[45] Date of Patent: Aug. 23, 1994

[54] DENSE MEDIA PROCESSING CYCLONE

[75] Inventor: Norman B. Mullins, Cedar Bluff, Va.

[73] Assignee: PV Enterprises, Inc., Altoona, Pa.

[21] Appl. No.: 22,907

[22] Filed: Feb. 26, 1993

[51] Int. Cl.$^5$ .................................... B01D 21/26
[52] U.S. Cl. .................. 210/512.1; 210/788
[58] Field of Search ............. 210/512.1, 512.3, 787, 210/788

[56] References Cited

U.S. PATENT DOCUMENTS

| 3,366,247 | 1/1968 | Visman | 210/512 |
|---|---|---|---|
| 3,887,456 | 6/1975 | Loughner | 209/211 |
| 3,940,331 | 2/1976 | Rastatter | 209/211 |
| 4,123,364 | 10/1978 | Mozley | 210/512 M |
| 4,203,831 | 5/1980 | Parnaby | 209/13 |
| 4,226,708 | 10/1980 | McCartney | 209/211 |
| 4,308,134 | 12/1981 | Lilleker et al. | 209/211 |
| 4,670,161 | 6/1987 | Hayatdavoudi | 210/739 |
| 4,711,720 | 12/1987 | Young | 210/512.2 |
| 4,793,925 | 12/1988 | Duvall et al. | 210/512.1 |
| 4,859,347 | 8/1989 | Simon et al. | 210/788 |
| 4,865,740 | 9/1989 | Callut | 210/512.2 |
| 5,078,549 | 1/1992 | Schweiss et al. | 406/173 |

FOREIGN PATENT DOCUMENTS 1465126  3/1989  U.S.S.R. ............ 210/512.1
9003221  4/1990  World Int. Prop. O. ....... 210/512.1

OTHER PUBLICATIONS

Dorr-Oliver Bulletin, No. 2508, the DorrClone Classifier for degritting sewage, 1957.

Primary Examiner—Frank Spear
Attorney, Agent, or Firm—Jacobson, Price, Holman & Stern

[57] ABSTRACT

Raw coal, in slurry form, is fed to a dense media cyclone, entering tangentially into the cyclone. Three major forces act on the solid particles as they travel radially and helically inside the cyclone body, forcing the heavier particles toward the wall of the body and the lighter particles toward the center. As the lighter particles near the frustoconical portion of the cyclone body, their velocity vector changes horizontally, causing them to exit the cyclone through the adjustable vortex finder. The heavier particles exit the opposite end through the apex, of which the diameter may be changed by interchangeable apex inserts. Adjusting the vortex finder and diameter of the apex allows the selection of a desired cut size and gravity of the particles. The attributes of the cyclones allow for a separation of coal from ash and sulfur in the 28×325 mesh size fraction.

18 Claims, 3 Drawing Sheets

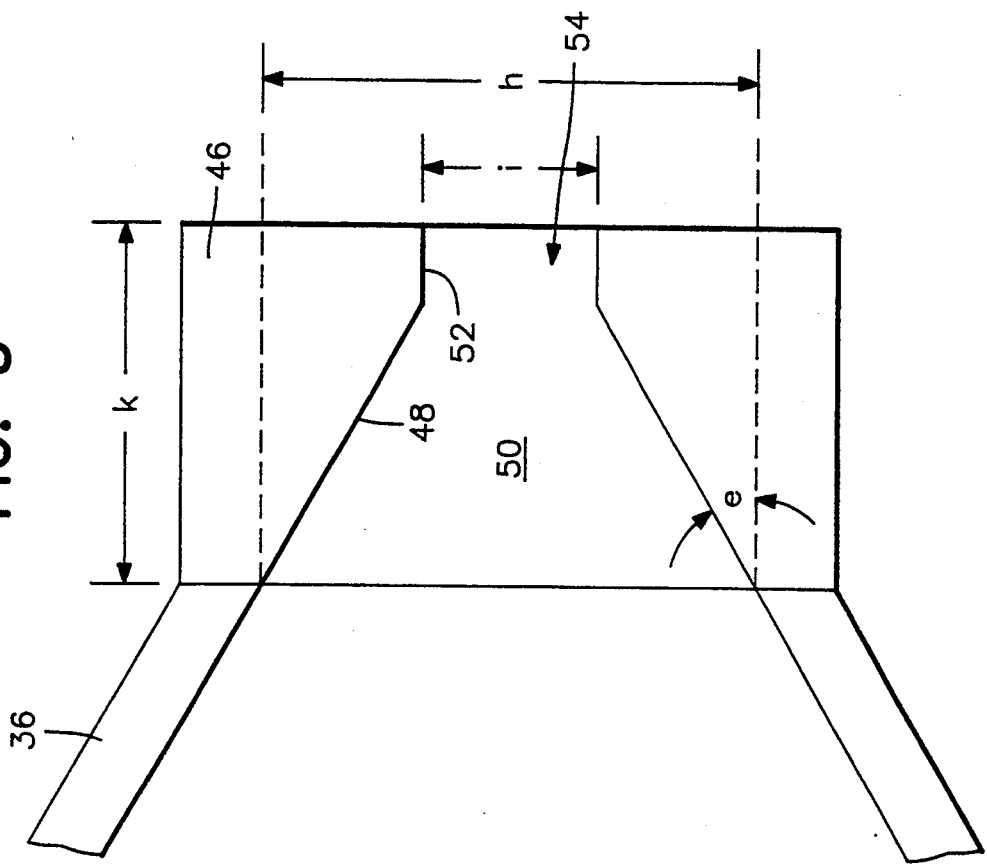
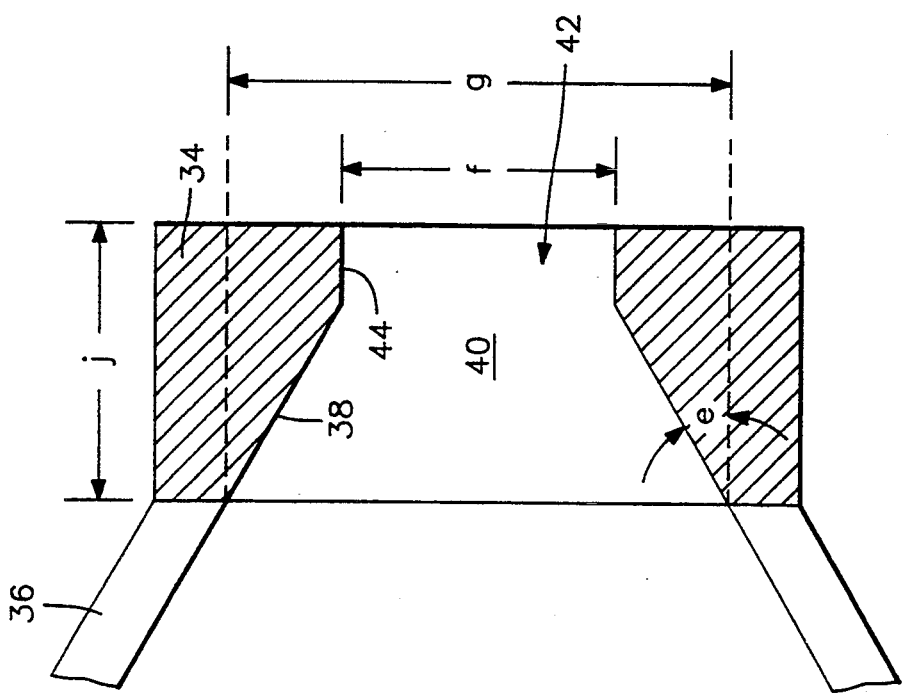

DENSE MEDIA PROCESSING CYCLONE

FIELD OF THE INVENTION

The present invention relates to improvements in separation of fine coal particles.

BACKGROUND OF THE INVENTION

In the mining of coal in the United States, specialized mining machines perform the act of digging the coal from coal seams. Due to the crushing effect encountered in the mining and preparation of coal, a large amount of fines (fine particles of coal) of a size less than 28 mesh are generated. For many, many years a great percentage of these fines were discarded as waste.

Since 1900, an estimated 50,000,000 tons of coal fines have been discarded into pond structures in the coal producing states of Pennsylvania, Maryland, West Virginia, Virginia, Kentucky, Tennessee, Ohio and Indiana. Some discarding of the ultra fines continues to date.

Prior attempts to separate coal fines have included froth flotation which is a process originated in the 1950's. Froth flotation has an efficiency rating of approximately 50% to 60% and is a very high cost method because of the electric power and chemicals required in this process.

Flotation is a widely used separation process which is based on the fact that some components in comminuted minerals are wettable (hydrophilic), whereas others are water-repellent (hydrophobic). Hydrophobic particles have an ability to hold air bubbles by surface action, the nature of the film on the outside of the particles being the controlling factor. Finely divided air which is introduced into the "pulp", the mixture of solids and water in which flotation is performed, adheres in the form of bubbles to these particles, more particularly the metalliferous components of the pulp, and causes them to rise to the surface. Here they collect in a mass of froth and are removed by a skimmer device. The hydrophilic components remain behind in the pulp. As a rule, these are the worthless minerals (gangue), which are removed as tailings from the flotation machine.

The floatability of minerals can be controlled by certain chemical additives called flotation agents. These are of various kinds:

Frothers, whose function is to produce froth by combining the air bubbles (introduced into the pulp by stirring or by the injection of compressed air) into a stable froth which will buoy up the ore particles. Oils and allied substances are used as frothers.

Collectors are substances that increase the water repellency and make the ore particularly receptive to the attachment of air bubbles. Collectors usually consist of synthetic organic compounds.

Other flotation agents help to regulate the process. So-called depressors can make hydrophobic minerals temporarily hydrophilic and can in this way help in the selective separation of one mineral from another by depressing one, thereby inhibiting its flotation. The "depressed" mineral can subsequently be made hydrophobic again by an activating agent. The various agents for regulating the flotation process in this manner are inorganic compounds, mostly salts.

One attempt to separate fine coal particles is disclosed in U.S. Pat. No. 4,203,831 to Parnaby. This patent describes a coal washing plant having two cyclone separators for separating coal from dross.

Other separators for separating coarse from fine particles are disclosed in U.S. Pat. No. 3,366,247 to Visman, U.S. Pat. No. 3,887,456 to Loughner, U.S. Pat. No. 3,940,331 to Rastatter, U.S. Pat. No. 4,123,364 to Mozley, U.S. Pat. No. 4,226,708 to McCartney, U.S. Pat. No. 4,308,134 to Lilleker et al., U.S. Pat. No. 4,670,161 to Hayatdavoudi, U.S. Pat. No. 4,711,720 to Young, U.S. Pat. No. 4,793,925 to Duvall et al., U.S. Pat. No. 4,859,347 to Simon et al., U.S. Pat. No. 4,865,740 to Callut, and U.S. Pat. No. 5,078,549 to Schweiss et al.

SUMMARY OF THE INVENTION

Generally, run-of-mine coal must be treated to remove ash sulfur, and other impurities Fine coal −28 mesh, typically comprises 5-20% by weight of run-of-mine raw coal. This size fraction is not conducive to processes designed to treat larger particles, namely heavy-media baths. Typically, this fraction is discarded or processed by other means, such as froth flotation or heavy-media or dense-media cyclones.

The present invention relates to a dense-media cyclone, or more specifically to an improvement over the Parnaby dense-media cyclone disclosed in U.S. Pat. No. 4,203,831. The Parnaby cyclone includes a cylindrical body of a 9" length and a frustoconical body portion having a 30° angle with an adjustable vortex finder of a diameter of approximately 4", fitted opposite the frustoconical body portion. At the outer end of the frustoconical body portion is the apex, on a significantly larger angle than that of the frustoconical body portion, which is interchangeable with respect to diameter. The axis of the Parnaby cyclone is horizontal.

In the present invention, coal, metals such as gold, molybdenum, copper, etc. are separated. Preferably, coal is separated by introduction of a raw coal slurry through a tangential port of a two-inch diameter at the end opposite to an apex. As the slurry travels radially and helically toward the apex, three major forces act within the cyclone on the particles: drag force, centrifugal force, and buoyancy. Particles on which the centrifugal force is higher than the drag force are pushed to the cyclone wall, while particles with a higher drag force than centrifugal force move toward the center; thus, centrifugal motion creates a specific gravity gradient, or buoyancy force, as coal has the lowest specific gravity of the various solids suspended in the slurry. The heavier particles continue along the wall and exit through the apex while the coal particles change direction and exit through the vortex finder.

Of the three major forces acting within the cyclone on the slurry: drag force, centrifugal force, and buoyancy, particles on which the centrifugal force is higher than the drag force are pushed to the cyclone wall, while particles with a higher drag force than centrifugal force move toward the center. The boundary between the two, where the drag equals the centrifugal force, is called the locus. Particles between the locus and the cyclone wall exit through the apex while particles between the locus and vortex exit through the vortex finder. The silts, clays, and sands in the slurry are suspended to create a dense medium. This dense medium creates the buoyancy force which increases the drag force on a given particle of a certain specific gravity. The operational parameters are set to create a predetermined optimal specific gravity of the media so that the drag and buoyancy forces are greater than the centrifugal force on the coal, causing the coal to move toward the free surface and exit in the product stream.

The Parnaby cyclone was able to effectively recover coal of a size +100 mesh, but discarded the −100 mesh material, which is usually a substantial amount of coal.

The present invention is an improvement over the Parnaby dense-media cyclone, which enables the processing of the −28 mesh fraction of coal particles and separate coal from ash and sulfur in the 28×325 mesh size fraction range.

The cylindrical portion of the cyclone body of the invention has been lengthened an additional 1.75" to a total of 10.75" to increase the retention time of particles in the cyclone. The design of the apex inserts has been modified so that the frustoconical section and the interchangeable apex inserts are of the same 30° angle, to alleviate the problem of a build-up of material adjacent to the apex, which destroys the sharpness of the separation. These improvements allow the cyclone of the invention to effectively recover coal to 325 mesh.

A slight modification was also made to the vortex finder. The diameter was increased 1.6 millimeters to a total of four inches for ease of accepting U.S. standard plumbing.

Raw coal, in slurry form, is fed to the dense media cyclone of the invention, entering tangentially into the cyclone. The three described major forces act on the solid particles as they travel radially and helically inside the cyclone body, forcing the heavier particles toward the wall of the body and the lighter particles toward the center. As the lighter particles near the frustoconical portion of the cyclone body, their velocity vector changes horizontally, causing them to exit the cyclone through the adjustable vortex finder. The heavier particles exit the opposite end through the apex, of which the diameter may be changed by means of interchangeable apex inserts. Adjusting the vortex finder and diameter of the apex allows the selection of a desired cut size and gravity of the particles. The attributes of the cyclones allow for a separation of coal from ash and sulfur in the 28×325 mesh size fraction.

After the separation has been made in the cyclone, the clean coal stream is dewatered. In operation, the 28×0 mesh size fraction is diluted and sized by means of seive screens and then transferred to the inventive cyclone for separation. The clean product gravity flows to a sump, from where it is pumped to classifying cyclones for sizing at 100 mesh. The +100 mesh flows to a centrifuge for drying. The −100 mesh flows to a sump and then is pumped to another bank of classifying cyclones for sizing at 325 mesh. The +325 is deposited on a high frequency vibrator for dewatering. The −325 mesh is wasted. After dewatering, the fine coal 28 mesh × 325 is blended with the washed coal circuits of plus 28 mesh, and placed in storage for rail, truck, or barge loading.

With the ability of the cyclone to separate dross and clean coal by specific gravity, the 28 mesh × 325 mesh sizes, which comprises 5% to 20% by weight of run-of-mine coal mined in the United States, the marketing of millions of additional tons of coal annually can be accomplished.

From an environmental standpoint the separability of previously discarded pond fines will be a remarkable achievement in cleaning up eyesores in the coal country. The inexpensive separation made possible by the invention to process pond fines and run-of-mine fines from preparation plants, plus low mileage rail and river transportation will in effect assist the electric generation industry in meeting the Clean Air Act regulations at a reasonable cost. This is compared to the staggering costs of building plant scrubbers for many electric generation stations consuming high sulphur coal. It is estimated that a scrubber installation for an average 1000 megawatt electric generating plant will cost $250,000,000 plus the operating costs which must include sludge removal. The enhanced separation ability can lower the sulphur content of coal products to the point of acceptance under the Clean Air Act Amendment of 1990.

It is now possible to operate a cyclone as embodied by the present invention in the following operating ranges:

Gallons Per Minute of slurry (GPM) — 100 to 150
% Solids — 8 to 20
Tons Per Hour — 6 to 12
Pounds Per Square Inch — 12 to 18
Size — less than 28 mesh Unlike typical coal cleaning cyclones, the present invention requires no magnetic or other high gravity material to create a media density suitable for recovering clean coal from a feed containing coal and impurities, such as ash and sulfur. The inventive cyclone utilizes the sands, silts, and clays in the feed to create the media density. Also, the inventive cyclone is mounted horizontally, whereas the vast majority of other cyclones are oriented vertically or with a slight pitch. Additional notable differences are the adjustable vortex finder and adjustable apex.

The horizontal orientation of the cyclone allows for a longer retention time of the slurry. The longer retention time enhances the separation of coal from impurities. This is one reason that the inventive cyclone cleans coal to finer sizes than other cyclones. Typical cyclones make a cut at about +100 mesh, whereas the inventive cyclone makes a cut at +325 mesh.

The apex is the end of the cyclone from which the rejects exit. By changing the apex to a larger diameter via changing the apex insert, a cleaner and finer product can be obtained. Inversely, decreasing the diameter results in a dirtier, coarser product.

The vortex finder is the tube from which the coal exits. Increasing the distance between the end of the vortex finder and the apex yields a finer and cleaner product. The inverse is true for decreasing the distance. With other cyclones, operation must be halted to change either the apex size or vortex finder setting as they must be disassembled, but the inventive cyclone can be adjusted without shutting down the flow or disassembly.

The apex insert is held in place by a hold-down bar that is mounted to a bracket inside the reject receiving box. Changing the apex insert is a simple process which can be completed in 30 to 60 seconds. The apex insert is removed by lifting the lid on the reject receiving box, loosening a nut on the hold-down bar and swinging it away, and pulling the insert out of the frustoconical section. A different apex insert is pushed into the frustoconical section, the hold-down bar is returned to its proper position, and the nut is tightened on the bar. The lid on the reject receiving box is closed and the process continues uninterrupted.

By setting a portion of the apex on the same angle as the cyclone body the dense particles are allowed to pass freely without extreme resistance and to provide for a gentler change in the velocity vector for the less dense particles. This allows a higher capacity and a finer cut size without destroying the sharpness of the separation due to mixing of materials at the apex. The proper combination of these changes enables the cyclone to recover coal down to +325 mesh.

It is therefore an object of the present invention to separate coal fines to a size down to 325 mesh by the use of a horizontally oriented separator cyclone having an apex insert, a portion of which extends at the same angle of a frustoconical portion of a body of the cyclone.

It is another object of the present invention to separate coal fines to a size down to 325 mesh by the use of a horizontally oriented separator cyclone having an apex insert, a portion of which extends at the same angle of a frustoconical portion of a body of the cyclone and where a cylindrical portion of the body extends for approximately 11.75 inches.

It is still yet another object of the present invention to separate coal fines to a size down to 325 mesh by the use of a horizontally oriented separator cyclone having an apex insert, a portion of which extends at the same angle of a frustoconical portion of a body of the cyclone and where a cylindrical portion of the body extends for approximately 11.75 inches with the apex insert and a vortex finder being adjustable so as to vary the size of particles removed from an introduced slurry.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 4 is a cross-sectional view of an apex insert.

FIG. 5 is a cross-sectional view of an alternate embodiment of an apex insert.

DETAILED DESCRIPTION OF THE PREFERRED EMBODIMENTS

Figure 1:
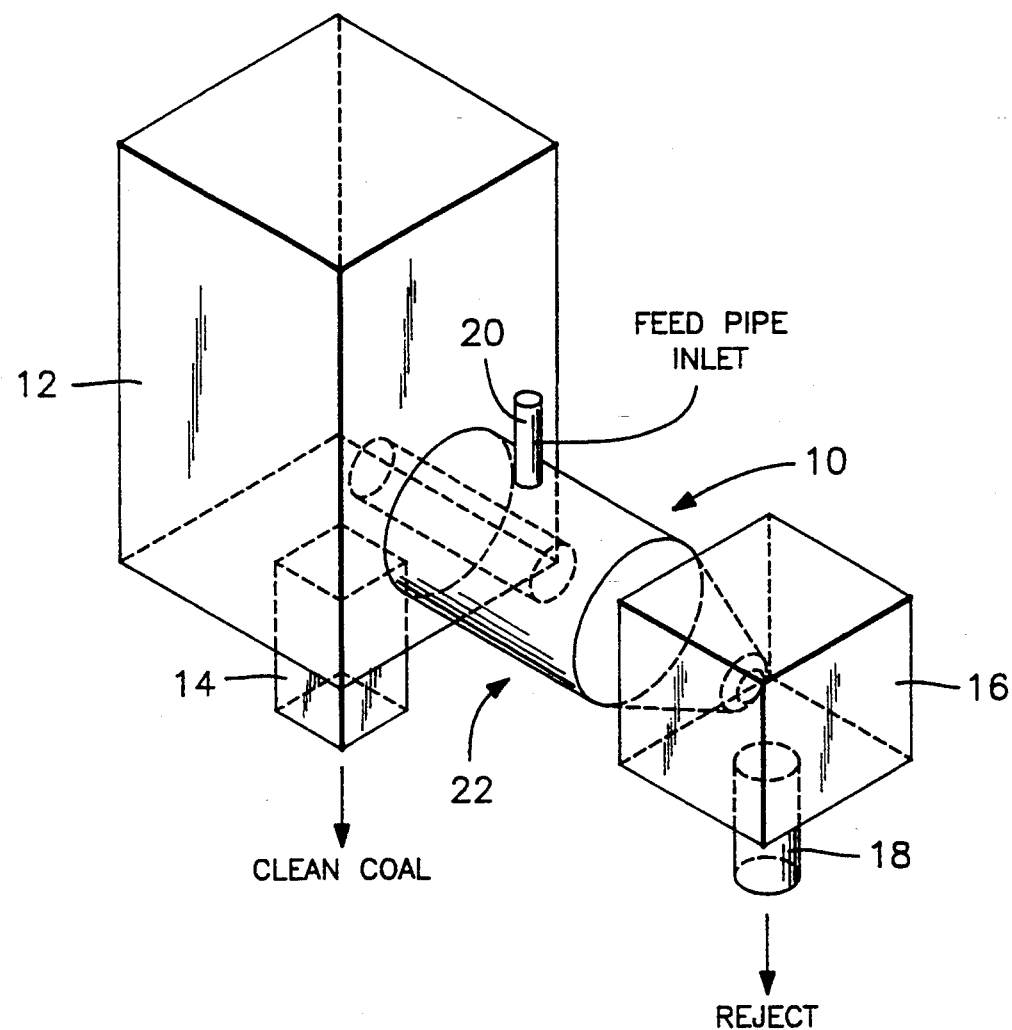
FIG. 1 is a schematic illustration of a horizontally oriented cyclone separator.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 3:
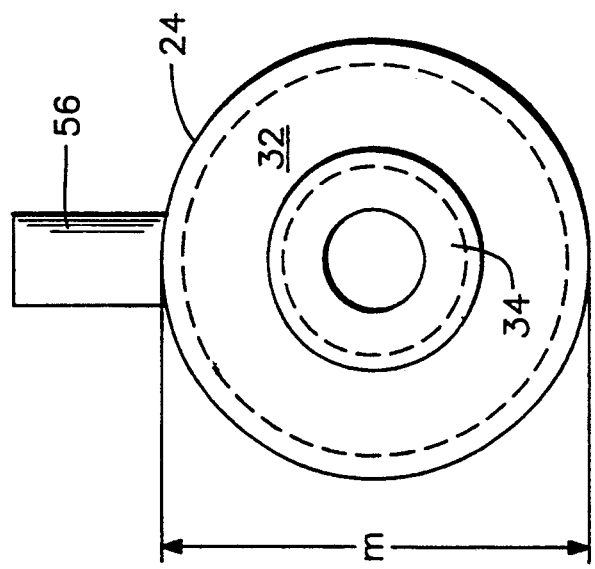
FIG. 3 is a right end view of the cyclone separator shown in FIG. 2.
Figure 2:
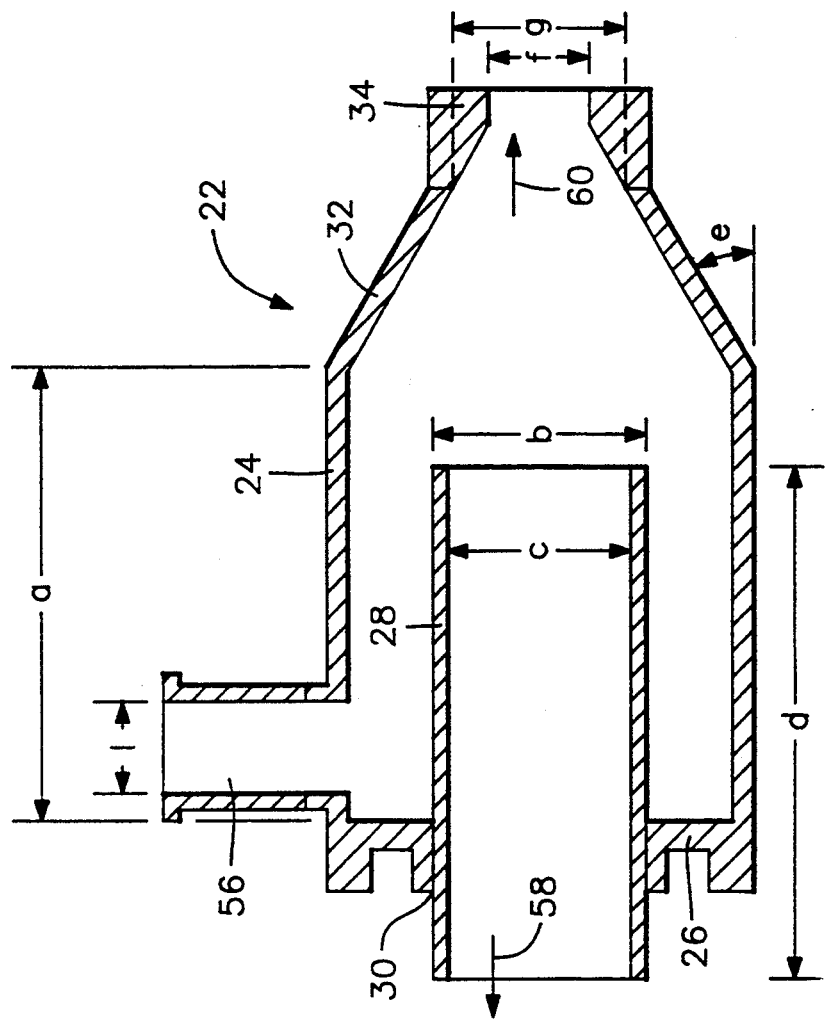
FIG. 2 is a cross-sectional view of a cyclone separator.

With reference to the drawings, in general, and to FIGS. 1 through 3, in particular, a dense media processing cyclone embodying the teachings of the subject invention is generally designated as 10. With reference to its orientation in FIG. 1, the dense media processing cyclone extends between a housing 12 for receiving clean coal removed by a chute 14. At the opposite end of the cyclone 10 is a housing 16 for transmittal of waste through a chute 18.

A slurry of material having up to 20% solids is introduced through a feed pipe inlet 20 extending from a body 22 of the cyclone 10. Separated materials exit through opposite ends of the body with the desired size particulate of the product to be recovered entering the housing 12 whereas the dross or waste material enters housing 16 for disposal.

In FIG. 2, the body 22 of the cyclone 10 is shown to include a cylindrical portion 24 having a length a of approximately 10.75 inches. The outer diameter m of the cylindrical portion 24 is equal to approximately 9.0 inches.

At one end of the cylindrical portion 24 is a solid closure wall 26 which seals one end of the cyclone body. Within wall 26 is a concentric tube or vortex finder 28. The vortex finder 28 has an outer diameter b of approximately 4.5 inches and an inner diameter c of approximately 4.0 inches. The length d of vortex finder 28 is approximately 10.625 inches. The vortex finder is slidably mounted within an opening 30 of wall 26 to adjust the position of the vortex finder with respect to the cylindrical portion 24.

At an opposite end of the cylindrical portion 24 is a frustoconical portion 32 which tapers inwardly from the cylindrical portion at an angle e of approximately 30°. The length of the frustoconical portion is approximately 4.5 inches.

At the most inwardly tapered portion of frustoconical portion 32 or end 36 is an apex insert 34. The apex insert is removably mounted on the end 36 of the frustoconical portion which is also the end of the body 22. The apex insert as well as the cyclone body is made of a nihard material having a hardness of at least 600 Bernell. An example of the materials forming the apex insert are iron, chrome and nickel.

The particular configuration of the apex insert are disclosed in more detail in FIGS. 4 and 5 which illustrate alternate apex inserts usable with the cyclone body 22 of FIG. 2. In FIG. 4, apex insert 34 includes a first angular portion 38 defining a channel 40 extending through the apex 34. Portion 38 is inclined at an angle of 30° equal to the angle of taper of the frustoconical portion 32. Dependent upon the size of an outlet opening 42 from channel 40, inclined portion 38 continues at the same angle of the frustoconical portion 32 until the desired diameter outlet opening 42 is achieved. In FIG. 4, a cylindrical portion 44 of channel 40 forming outlet opening 42 has a diameter f of approximately 2 inches. Therefore, the inclined portion 38 has an initial diameter g of approximately 3.5 inches and tapers inwardly to a diameter of approximately 2 inches (f), forming the diameter of the outlet opening 42.

Similarly, in FIG. 5, an alternate apex insert 46 is shown having an inclined portion 48 having an angle of taper of 30° equal to the angle of taper of the frustoconical portion 32 and abutting the apex insert 46 at end 36. The diameter h of the channel 50 formed in apex insert 46 is approximately 3.5 inches as was diameter g for apex insert 34. The inclined portion 48 tapers inwardly to a desired diameter i for cylindrical portion 52 defining outlet opening 54, in this instance, approximately 1.5 inches. Therefore, although the width j for apex insert 34 in FIG. 4 is less than the width k for apex insert 46, the same angle of inclination, approximately 30°, is defined by inclined portions 38, 48, respectively.

By having a portion of an apex insert inclined at the same angle of the frustoconical portion 32 of the body 22 of the cyclone, an improved separation of fine particles from the slurry introduced into the body of the cyclone is achieved.

It is therefore possible to introduce a slurry, containing up to 20% solids, into inlet opening 56 of the body 22. The diameter 1 of inlet opening 56 is approximately 2 inches. The slurry introduced into the body is effected by the three forces previously described such that the fine coal particles of a size greater than 325 mesh exit through the vortex finder in the direction of arrow 58. In contrast, the waste material including coal of a size less than 325 mesh exits through the apex insert in the direction of arrow 60.

The inclined portion of the apex insert provides a sharp line of demarkation for the separation of particular sized solids from the slurry. The material of which the insert is made also prevents damage to the end 36 of the frustoconical portion 32. Previous practices have experienced a rapid wearing away of this area. Further, by changing the diameter of the outlet openings 42, 54, a change in the size of fines removed through the vortex finder is achieved.

Having described the invention, many modifications thereto will become apparent to those skilled in the art to which it pertains without deviation from the spirit of the invention as defined by the scope of the appended claims.

I claim:

1. A dense media cyclone separator comprising:
   a substantially horizontally oriented body,
   said body having a cylindrical portion and a frustoconical portion tapering inwardly at an angle from said cylindrical portion,
   a vortex finder in an end wall of said cylindrical portion location concentrically with respect to said cylindrical portion,
   an apex insert mounted at a free end of said frustoconical portion of said body,
   said apex insert consisting of a channel having an inclined portion tapering inwardly at an angle equal to the angle of said frustoconical portion and extending continuously with said frustoconical portion,
   said inclined portion of said apex insert terminating at a cylindrical outlet opening of said channel having a diameter equal to a diameter of said inclined portion at said cylindrical outlet opening for receipt by said cylindrical outlet opening of waste material separated from a slurry introduced into the body while useful material separated from the slurry is transmitted through said vortex finder in a direction opposite to the direction of travel of the waste material passing through the cylindrical outlet opening.

2. A cyclone separator as claimed in claim 1, wherein the useful material is of a size greater than 325 mesh.

3. A cyclone separator as claimed in claim 1, wherein the angle of said frustoconical portion is 30°.

4. A cyclone separator as claimed in claim 1, wherein an inlet opening extends through said cylindrical portion for receipt of the slurry.

5. A cyclone separator as claimed in claim 1, wherein said vortex finder is slidably mounted in said end wall.

6. A cyclone separator as claimed in claim 1, wherein said outlet opening is concentric with said cylindrical portion and said vortex finder.

7. A cyclone separator as claimed in claim 1, wherein said cylindrical portion is 10.75 inches long.

8. A cyclone separator as claimed in claim 1, wherein the slurry contains up to 20% solids.

9. A cyclone separator as claimed in claim 8, wherein the slurry includes coal.

10. A dense media cyclone separator comprising:
    a body having an inlet opening for introduction of slurry having up to 20% solids,
    a cylindrical portion of said body extending substantially horizontally,
    a frustoconical section of said body extending at one end from said cylindrical portion and tapering inwardly at a predetermined angle,
    an end wall secured to said cylindrical portion on an end of said cylindrical portion opposite to said frustoconical portion,
    a vortex finder extending horizontally through said end wall,
    an apex insert mounted on an end of said frustoconical portion opposite to said cylindrical portion,
    said apex insert consisting of a channel extending therethrough, an inclined portion of said channel extending at an angle equal to said predetermined angle of said frustoconical portion and extending continuously with and in alignment with said frustoconical portion, and a cylindrical outlet opening of said channel being in communication with said inclined portion of said channel for receipt of waste material separated from the slurry introduced into said body while said vortex finder receives useful material separated from said slurry.

11. A dense media cyclone separator as claimed in claim 10, wherein the useful material is of a size greater than 325 mesh.

12. A dense media cyclone separator as claimed in claim 10, wherein said predetermined angle is 30°.

13. A dense media cyclone separator as claimed in claim 10, wherein an inlet opening extends through said cylindrical portion for receipt of the slurry.

14. A dense media cyclone separator as claimed in claim 10, wherein said vortex finder is slidably mounted in said end wall.

15. A dense media cyclone separator as claimed in claim 10, wherein said outlet opening is concentric with said cylindrical portion and said vortex finder.

16. A dense media cyclone separator as claimed in claim 10, wherein said cylindrical portion is 10.75 inches long.

17. A dense media cyclone separator as claimed in claim 10, wherein the slurry contains up to 20% solids.

18. A dense media cyclone separator as claimed in claim 17, wherein the slurry includes coal.

* * * * *